United States Patent [19]

Valkenburg

[11] 4,332,216

[45] Jun. 1, 1982

[54] PROCEDURE AND ARRANGEMENT FOR KEEPING LIVESTOCK

[76] Inventor: Wilhelmus G. H. Valkenburg, Stalbergweg 8, Venlo, Netherlands

[21] Appl. No.: 165,688

[22] Filed: Jul. 3, 1980

[30] Foreign Application Priority Data

Jul. 13, 1979 [NL] Netherlands .......................... 7905474
Jan. 30, 1980 [NL] Netherlands .......................... 8000563

[51] Int. Cl.³ ............................................. A01K 31/04
[52] U.S. Cl. ..................................................... 119/22
[58] Field of Search ........................ 119/22, 18, 21, 95

[56] References Cited

U.S. PATENT DOCUMENTS

| 1,807,932 | 6/1931 | Rainwater | 119/22 |
| 2,601,844 | 7/1952 | Lovell | 119/22 |
| 3,658,031 | 4/1972 | Coe | 119/22 |
| 3,779,210 | 12/1973 | Blair | 119/22 |

FOREIGN PATENT DOCUMENTS

| 880679 | 9/1971 | Canada | 119/95 |
| 2716461 | 10/1978 | Fed. Rep. of Germany | 119/22 |
| 2242930 | 4/1975 | France | 119/22 |
| 406851 | 3/1934 | United Kingdom | 119/22 |

*Primary Examiner*—Jay N. Eskovitz
*Attorney, Agent, or Firm*—Morse, Altman, Oates & Dacey

[57] ABSTRACT

A procedure and arrangement for sanitarily housing livestock is described. The procedure is characterized in separating animal waste as soon as it impacts on a floor covering into its liquid and solid constituents. The liquid constituents are continuously drained off the floor covering by gravity. The solid constituents are accumulated on the covering and are, together with the floor covering, periodically removed. The arrangement is made up of a frame, including a support and a drain channel. A flexible sheet is designed to rest on the support. A portion of the support and the sheet slopingly connects with the drain channel.

6 Claims, 7 Drawing Figures

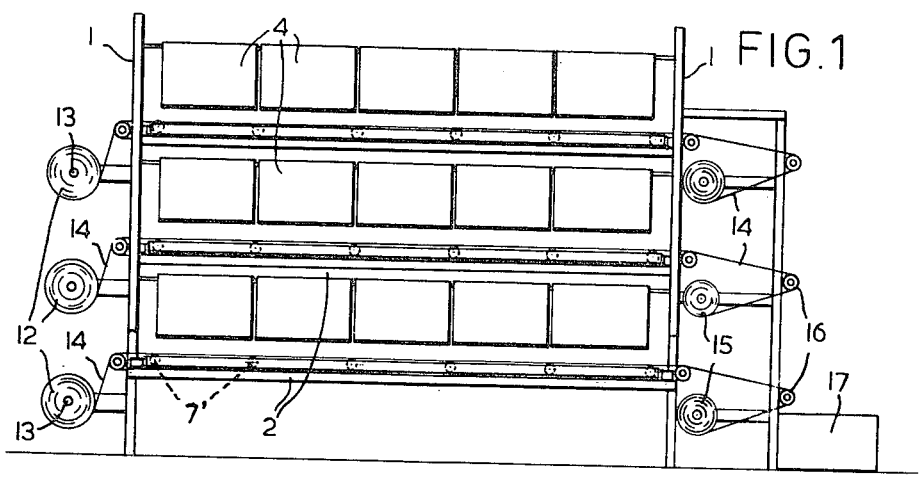
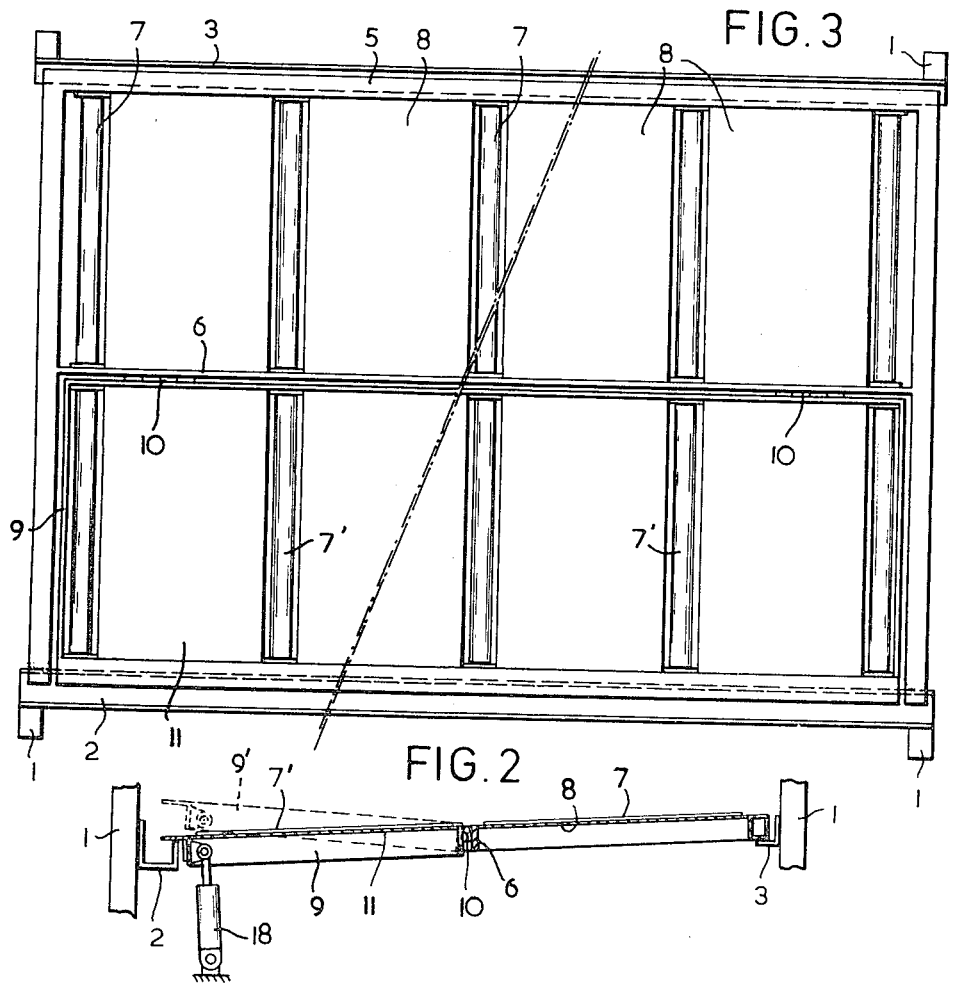

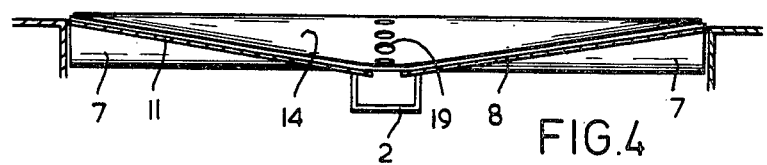
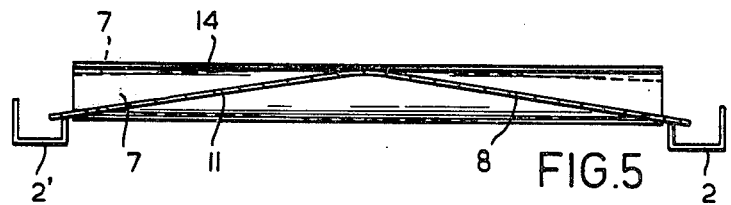
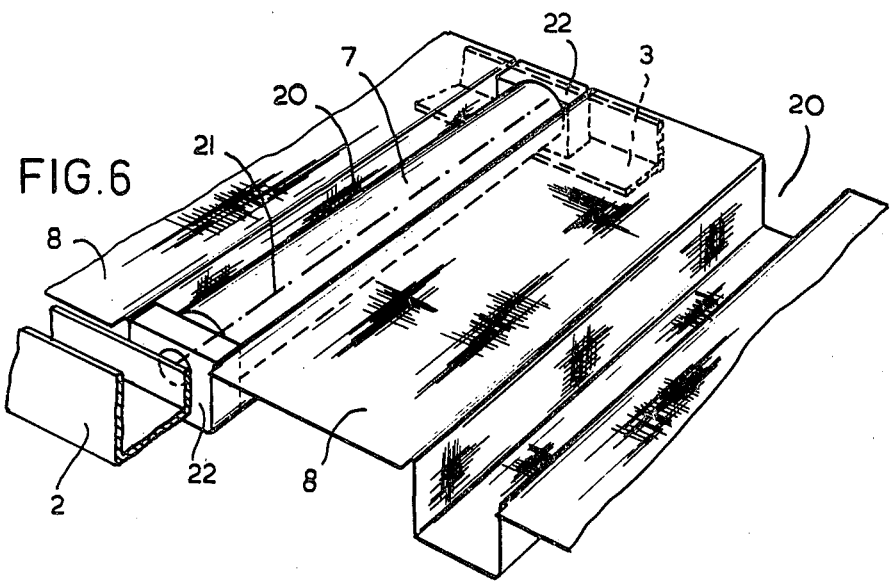
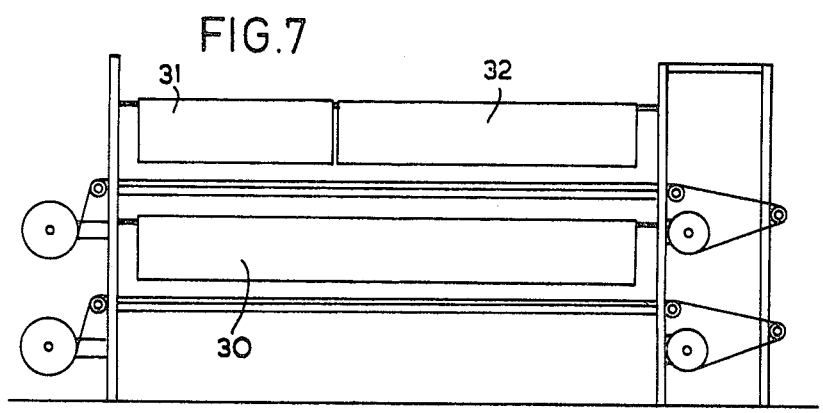

PROCEDURE AND ARRANGEMENT FOR KEEPING LIVESTOCK

The invention relates to a procedure for keeping livestock, also an arrangement which is suitable for use with such a procedure.

When keeping livestock such as small animals, i.e., rats, mice and rabbits, also large animals such as pigs and cows, one of the major problems is that of dealing with the dung from the animals.

Dung with urine gives rise to ammonia formation, thus causing the formation not only of a smell which is extremely unpleasant although not harmful to humans and animals, but also such dung is a good breeding ground for all types of bacteria. All this is extremely disadvantageous for hygiene and has a harmful effect both on fertility and on the health of young and older animals. Such unhygienic conditions also exert a negative effect on both the animal and also on production if livestock are being fattened.

The invention relates to a procedure and to an arrangement whereby livestock can be kept under optimum conditions, also as regards hygiene, with a minimum environmental burden.

For this purpose it is proposed in accordance with the invention that in connection with the keeping of livestock the liquid constituents of the dung and the solid constituents thereof are separated from each other as soon as possible and possibly discharged elsewhere as soon as feasible. Preferably the liquid constituents are discharged continuously, the solid components being removed periodically.

The fact has surprisingly emerged that by separating the solid and liquid constituence of the dung from each other as soon as possible the formation of unpleasant odours is prevented to a high degree, whilst this also favours hygienic conditions. By removing the liquid constituents almost immediately, the solid constituents of the dung can be left for a longer period, up to seven days or more, in the cages or near the livestock without unfavourable consequences ensuing.

In accordance with the invention an arrangement suitable for employing the proposed procedure can be provided with a section of a dung discharge device which slopes at least in one direction locally, whereby this lowest portion connects up with a liquid discharge device, such as a drain.

When a large number of animals are placed close to each other in cages, it is possible in accordance with the invention to make appropriate use of a dung conveyor belt which is placed underneath the cages, this conveyor belt being executed so that it slopes at least locally.

The fact has emerged that a skew-erected conveyor belt as such gives rise to problems, in that this tends to run off the rollers. In accordance with one embodiment of the invention the support for the conveyor belt can be provided in such a way that the belt runs essentially horizontally during the movement of the conveyor belt, but where a portion of the supporting device for the belt is capable of movement between a horizontal position and a sloping position, this latter position being adopted when the conveyor belt for discharging the liquid constituents of the dung into a discharge drain is stationary. An appropriate solution is also obtained if the support is so designed that the belt is either concave or spherical. In the case of a spherical belt there are liquid discharge drains along both side edges of the belt. With a hollow belt the centre portion of the belt should be perforated at least locally, a liquid drain being provided underneath the perforations.

In accordance with a further embodiment of the invention the arrangements forming the subject of the invention is particularly suitable for fattening farms, whereby it is possible to place the young livestock to be fattened at a higher level in smaller cages and, for example after half the fattening period has expired, to transfer this livestock into larger cages underneath.

Further details of the invention can also be obtained from the following description of an embodiment.

FIG. 1 shows schesmatically a number of cages for animals provided with a dung conveyor belt.

FIG. 2 shows schesmatically a cross-section of a part of the arrangement illustrated in FIG. 1, in which no cages are shown.

FIG. 3 is a schesmatic top view of a supporting device for the dung conveyor belt which is movable lengthwise.

FIG. 4 is a schesmatic cross-section of a varied embodiment.

FIG. 5 illustrates an embodiment with a spherically curved support for a conveyor belt.

FIG. 6 shows schesmatically in cross-section details of the supporting structure. and FIG. 7 shows schesmatically an arrangement for fattening pigs.

The arrangement shown in FIG. 1 for keeping livestock is built up from a framework with columns 1 and horizontal beams 2 and 3 which link these columns. The front beams 2 form liquid discharge drains, whilst the rear beams are formed by angle-irons. In the framework are placed a large number of cages 4 which are located side-by-side and one above the other, made in a known manner from mesh or the like. Underneath each horizontal row of cages 4 placed side-by-side there is at least one supporting device provided as shown in FIG. 3. This supporting device is built up from a U-shaped frame 5 in which a connecting beam 6 is provided parallel with the long side. Between the connecting beam 6 and the rib portions which connect the two arms of the U-shaped frame 5 there are a number of rollers 7, which are freely rotable, and which are mounted in parallel with each other and vertical to the connecting beams 6. The space between consecutive rollers is filled out by means of plate-like and perforated sections 8, e.g., made of mesh, which are fastened to the framework 5 and the intermediate beam 6.

Between the ends of the legs of the frame 5 there is a framework 9 which is essentially rectangular. This frame is fastened with the aid of hinges 10 to the connecting beam 6 in such a way that the frame can swival with respect to the connecting beams 6. In the frame 9, level with the rollers 7, rollers 7' are provided which are mounted so as to be freely rotable, whereby the small spaces in the frame 9 between the rollers 7' are similarly filled up with plate-like supporting sections 11. As can be seen from FIG. 2 the frame 5 in the framework formed by the columns 1 and the horizontal beams 2 and 3 is supported by the drain-shaped beam 2 and beam 3 which is designed as an angle-iron in such a way that the top surface of the plate-like components 8 and 11 which are located in one panel slope to some extent in the direction of the drain 2.

The rollers 7 and 7' will always project somewhat above the adjacent plate-like components.

As can be seen from FIG. 1 on the left hand side of the frame there are three stock reels 12 which are mounted one above the other and can rotate around the shafts 13. Each reel 12 comprises a foil 14, preferable made from thin plastic, which is guided over the reels 7 and 7' and the plate-like components 8 and 11 (see FIG. 3) as supporting device under a corresponding row of cages 4. On the right hand side of the frame the foil can be wound up once more onto reels 15. Preferably the longitudinal edge of the foil 14 hangs precisely in the drain 2, so that the liquid component of the dung from the animals present in the cages is discharged immediately. It will be clear that the drain 2 should preferably slope somewhat. If required the drains can be regularly flushed in order to improve the discharge of the liquid constituents from the dung to a suitable intercept tank. Thanks to the sloping design of the dung interceptor belt the liquid will be continuously discharged. At certain times the reels will be set into motion so as to remove the dung interceptor belt which is loaded with solid dung constituence. Then the solid dung constituents, as the foil passes downwards after the reversing roll 16, can drop into an interceptor trough 17. If required scraping can also be provided at the reversing rolls. However it should be noted that it is also possible to roll up the foil together with the solid dung constituents and to discharge this in toto. The fact has emerged that with this embodiment of the dung interceptor foil and the movement thereof, it can suffice to use an extremely thin foil of a few tenths of a millimeter, because the belt can still be pulled quite easily thanks to the supporting rollers 7 and 7' and the intervening supporting plates 8 and 11. The fact has emerged that due to the immediate removal of the liquid constituents of the dung, the solid constituents can be left for an extended period underneath the cages without this having unfavourable or unpleasant consequences. Renewal of the dung conveyor belt once every seven or even more days appears to be permissable.

It is generally not possible, certainly not in the case of an extremely thin foil as conveyor belt, to move this when loaded with dung in the sloping condition, such as is required for the continuous removal of the liquid constituents. For this reason with the embodiment as shown in FIG. 2 use is made of the frame 9. Underneath this frame section 9 there is at least one hydraulic cylinder 18 acting as the movement device for swiveling the frame section 9 around the hinge axis 10 from the sloping state into the state 9' illustrated by the dotted line in FIG. 2. It is also possible to design the entire frame 5 so that it can swivel around one axis of the horizontal beam 3, so that the entire belt with supporting device can be moved from a sloping into a horizontal position.

Furthermore as shown in FIG. 4 it is possible to install the supporting plate 8 and 11 respectively so that they slope towards each other and to arrange the drain 2 in the centre. In this case the dung transport foil 14 is perforated in the centre at 19, so that the liquid constituents of the dung can flow into the centre and out of the foil. Here it is possible to design the rollers 7 so that they are cylindrical, whereby the foil will always sag to some extent between the rollers, or to make these rollers to some extent double-comb shaped so that the top surface thereof corresponds with the slope of the supporting plates 8 and 11. In this latter case, during the passage of the dung conveyor belt, some slip will occur between parts of the roller surface and the dung conveyor foil.

A variant of the embodiment shown in FIG. 4 is illustrated in FIG. 5. Here the plates 8 and 11 slope outwards, a drain 2 and 2' being provided along both side edges. The drain 2' then takes the place of the angle-iron 3. In this case also the rollers 7 can be made either cylindrical or somewhat tapered towards the outer edge.

FIG. 6 illustrates a simple embodiment for supporting the conveyor belt. In this case the supporting plates 8 are formed from a single piece of perforated plate. At 20 this perforated plate is provided with right angled drains at a distance of roughly cm in which the roller 7 can be accommodated. The actual rollers are provided with shafts 21 indicated by interrupted lines. These shafts are pushed into bearing blocks 22, which fit precisely into the drain 20. The bearing blocks 22, of which there is one on each end of each drain 20 are kept in place by the edges of the discharge drain 2 or the beam 3 (see FIG. 2).

A roller can be quite simply removed by lifting this out of a drain 20, removing the bearing block, after which the roller can be freely extracted. It should be noted that such a perforated plate made of mesh material can if required, be bent in the transverse direction so as to obtain the desired convex or possible concave shape.

For fattening up livestock it is conventional practice to transfer young pigs which have been born in a breeding establishment after a number of weeks to a fattening regime. Generally it is customary for the pigs to remain 18 weeks on a fattening regime after which they are ready for slaughtering. Here there are always 10 pigs in one cage size approximately 2 by 3 meters.

When employing the arrangement in accordance with the invention, where use is made of at least two rows of cages placed one above the other, the lowest row of cages is arranged corresponding with the desired dimensions of 2 by 3 meters for 10 individual pigs. This is indicated in FIG. 7 by 30. Above there are always two cages 31 and 32 respectively, whereby the dimensions of a cage 32 are so selected that this has precisely sufficient dimensions for accommodating 10 pigs after these have been on a fattening regime. After these 9 weeks have expired the pigs are moved from cage 32 to cage 30 where they still need to stay for 9 weeks. Using a dung discharge system in accordance with the invention it is permissable to keep almost twice the number of pigs in the existing building so that these building have almost double the pig rearing capacity. It is even possible to transfer the pigs 4 weeks earlier than normal from the breeding regime over to the fattening regime and to place these for example in cage 31, which can thus also be smaller than cage 32.

The pigs leave the cells normally 4 weeks before they go on to fattening regime. In this case, thanks to the improved hygienic conditions prevailing, it is possible to accommodate the young pigs for the first 4 weeks in cage 31, then to move them to cage 32 where they remain for about 9 weeks and subsequently to cage 30 where they spend the last 9 weeks.

In this way the output from a pig fattening farm can be considerably increased.

It will be obvious that such a staged method of fattening is also applicable for livestock other than pigs. Use can be made for example of runways or other connecting devices which facilitate the easy transfer of the animals from a top cage to one of the underlying cages.

I claim:

1. Arrangement for sanitarily housing livestock in a number of cages mounted adjacent one another comprising:
   (a) a frame horizontally supporting said number of cages;
   (b) an animal waste interceptor device operatively mounted in said frame and below said number of cages, said device including a support comprising a plurality of rollers and platelike sections alternatively disposed along the length of said support, at least a portion of said rollers and platelike sections being swinglike mounted between a substantially horizontal position and a sloping position, means for swinging said portion of said rollers and platelike sections from said sloping position to said substantially horizontal position, and a belt designed to rest on said support and to unwind from a stock reel mounted at one end of said frame and to be wound on a take-up reel mounted at the other end of said frame;
   (c) a liquid waste discharge device mounted lengthwise in said frame and along one edge of said belt; and
   (d) a receptacle for solid waste mounted in said frame transverse to said liquid waste discharge device and adjacent said take-up reel for said belt,
   whereby liquid animal waste is continuously being discharged from said animal waste interceptor device into said liquid waste discharge device, with at least a portion of said belt resting on said portion of said rollers and platelike sections being in said sloping position, and solid animal waste being removed at periodic intervals from said animal waste interceptor device into said receptacle, with said portion of said rollers and platelike sections being swung into said substantially horizontal position by said means, and with said belt unwinding from said stock reel onto said take-up reel.

2. The arrangement of claim 1 wherein said support of said animal waste interceptor device is formed of an open-mesh wire screen of unitary construction having flat plate-like sections, said sections equidistantly separated from each other by right-angled channels, each of said channels designed to accommodate one of said plurality of rollers.

3. The arrangement of claim 1 wherein said support of said animal waste interceptor device is formed of flat plate-like sections, said sections sloping outwardly toward both edges of said frame, with a separate liquid waste discharge device mounted along said edges of said frame, said plurality of rollers being tapered toward said edges of said frame, with said belt slopingly contacting both said liquid waste discharge devices alongside both said edges of said frame.

4. The arrangement of claim 2 further including a plurality of bearing blocks, with a pair of said bearing blocks designed to be accommodated in the respective ends of each of said right-angled channels, each of said pair of said bearing blocks designed rotatably to support one of said plurality of rollers in each of said channels.

5. The arrangement of claim 1 wherein said support of said animal waste interceptor device comprises a U-shaped structure swinglike mounted in said frame between a substantially horizontal position and a sloping position, said U-shaped structure supporting said plurality of rollers and platelike sections alternatively along the length of said structure.

6. The arrangement of claim 1 wherein said plurality of rollers project somewhat above the planes of said platelike sections.

* * * * *